(12) United States Patent
Mathew et al.

(10) Patent No.: US 9,281,908 B2
(45) Date of Patent: Mar. 8, 2016

(54) SYSTEMS AND METHODS FOR MEMORY EFFICIENT SIGNAL AND NOISE ESTIMATION

(75) Inventors: George Mathew, San Jose, CA (US);
Yuan Xing Lee, San Jose, CA (US);
Hongwei Song, Longmont, CO (US);
David L. Parker, Firestone, CO (US);
Scott M. Dziak, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2282 days.

(21) Appl. No.: 12/247,378

(22) Filed: Oct. 8, 2008

(65) Prior Publication Data

US 2010/0088357 A1    Apr. 8, 2010

(51) Int. Cl.
*G06F 17/10* (2006.01)
*H04B 17/327* (2015.01)
*H04B 17/26* (2015.01)

(52) U.S. Cl.
CPC .............. *H04B 17/327* (2015.01); *H04B 17/26* (2015.01)

(58) Field of Classification Search
None
See application file for complete search history.

(56) References Cited

U.S. PATENT DOCUMENTS 5,262,904 A   11/1993   Tang et al.
5,357,520 A   10/1994   Arnett et al.
(Continued)

FOREIGN PATENT DOCUMENTS

GB    2 320 866    7/1998

OTHER PUBLICATIONS

U.S. Appl. No. 12/199,325, filed Aug. 27, 2008, Mathew.
(Continued)

*Primary Examiner* — David H Malzahn

(57) ABSTRACT

Various embodiments of the present invention provide systems and methods for estimating signal and noise powers in a received signal set. For example, one embodiment of the present invention provides a method for determining signal power and noise power. The method uses a storage medium that includes a $N_a \times N_w$ data pattern. The $N_a \times N_w$ data pattern includes $N_a$ bits repeated $N_w$ times. Both $N_a$ and $N_w$ are each greater than one. The methods further include performing an initial read of the $N_a \times N_w$ data pattern, which is stored to a first register. $N_r$ subsequent reads of the $N_a \times N_w$ data pattern are each processed by: performing a subsequent read of the $N_a \times N_w$ data pattern, and performing a difference calculation using the initial read of the $N_a \times N_w$ data pattern and the subsequent read of the $N_a \times N_w$ data pattern and resulting in the calculation of a difference vector that is stored to a second register; and performing a difference accumulation calculation to generate an accumulation vector which is stored to a third register. Based at least in part on the stored $N_a \times N_w$ data pattern and the stored difference vector, an electronics noise power is calculated.

20 Claims, 7 Drawing Sheets

(56) References Cited

U.S. PATENT DOCUMENTS

| | | | |
|---|---|---|---|
| 5,493,454 | A | 2/1996 | Ziperovich et al. |
| 5,517,146 | A | 5/1996 | Yamasaki |
| 5,583,705 | A | 12/1996 | Ziperovich et al. |
| 5,781,358 | A | 7/1998 | Hasegawa |
| 5,986,830 | A | 11/1999 | Hien |
| 5,999,355 | A | 12/1999 | Behrens et al. |
| 6,043,942 | A | 3/2000 | Cunningham et al. |
| 6,081,822 | A * | 6/2000 | Hillery et al. ............... 708/445 |
| 6,091,560 | A | 7/2000 | Du |
| 6,130,794 | A | 10/2000 | Christensen |
| 6,134,691 | A | 10/2000 | Hirasaka |
| 6,141,168 | A | 10/2000 | Takahashi et al. |
| 6,147,828 | A | 11/2000 | Bloodworth et al. |
| 6,181,505 | B1 | 1/2001 | Sacks et al. |
| 6,208,481 | B1 | 3/2001 | Spurbeck et al. |
| 6,212,024 | B1 | 4/2001 | Igarashi et al. |
| 6,243,031 | B1 | 6/2001 | Jusuf et al. |
| 6,246,723 | B1 | 6/2001 | Bliss et al. |
| 6,337,778 | B1 | 1/2002 | Gagne |
| 6,396,651 | B1 | 5/2002 | Grover |
| 6,404,572 | B1 | 6/2002 | Hong |
| 6,535,345 | B1 | 3/2003 | Shimoba |
| 6,563,655 | B1 | 5/2003 | Yamasaki et al. |
| 6,621,648 | B2 | 9/2003 | Elliott et al. |
| 6,662,303 | B1 | 12/2003 | Toosky et al. |
| 6,671,244 | B2 | 12/2003 | Honma |
| 6,674,590 | B2 | 1/2004 | Ottesen et al. |
| 6,678,230 | B2 | 1/2004 | Mayashita et al. |
| 6,721,114 | B1 | 4/2004 | Sutardja et al. |
| 6,788,481 | B2 | 9/2004 | Fang et al. |
| 6,894,854 | B1 | 5/2005 | Carlson et al. |
| 6,912,682 | B1 | 6/2005 | Aoki |
| 6,934,100 | B2 | 8/2005 | Ueno |
| 6,937,415 | B2 | 8/2005 | Galbraith et al. |
| 7,012,772 | B1 | 3/2006 | Vis |
| 7,079,342 | B1 | 7/2006 | Han et al. |
| 7,092,179 | B2 | 8/2006 | Yamanouchi |
| 7,123,429 | B2 | 10/2006 | Musungu et al. |
| 7,126,773 | B1 | 10/2006 | Taratorin |
| 7,193,802 | B2 | 3/2007 | Cideciyan et al. |
| 7,248,424 | B2 | 7/2007 | Ueno |
| 7,256,954 | B2 | 8/2007 | Serizawa et al. |
| 7,262,928 | B1 | 8/2007 | Oberg |
| 7,271,753 | B1 | 9/2007 | Padukone et al. |
| 7,308,057 | B1 | 12/2007 | Patapoutian |
| 7,426,236 | B1 | 9/2008 | He |
| 7,440,224 | B2 | 10/2008 | Ehrlich et al. |
| 7,495,854 | B2 | 2/2009 | Hutchins |
| 7,542,227 | B2 | 6/2009 | Che et al. |
| 7,715,135 | B1 | 5/2010 | Sutardja et al. |
| 7,733,591 | B2 | 6/2010 | Bottemiller et al. |
| 2002/0159350 | A1 | 10/2002 | Ogura |
| 2003/0026354 | A1 | 2/2003 | Chang et al. |
| 2003/0048564 | A1 | 3/2003 | Koller et al. |
| 2005/0117243 | A1 | 6/2005 | Serizawa et al. |
| 2006/0061496 | A1 | 3/2006 | Stein et al. |
| 2006/0062125 | A1 | 3/2006 | Horie et al. |
| 2006/0176947 | A1 | 8/2006 | Lim |
| 2007/0041115 | A1 | 2/2007 | Lee |
| 2007/0047120 | A1 | 3/2007 | DeGroat |
| 2007/0076313 | A1 | 4/2007 | Hutchins |
| 2007/0140088 | A1 | 6/2007 | Hino et al. |
| 2008/0031114 | A1 | 2/2008 | Hong et al. |
| 2008/0037153 | A1 | 2/2008 | Yoshizawa |
| 2008/0287072 | A1 * | 11/2008 | Elenes et al. ............... 455/73 |
| 2011/0164669 | A1 * | 7/2011 | Mathew et al. ............... 375/227 |

OTHER PUBLICATIONS

U.S. Appl. No. 12/273,265, filed Nov. 18, 2008, Mathew.

* cited by examiner

SYSTEMS AND METHODS FOR MEMORY EFFICIENT SIGNAL AND NOISE ESTIMATION

BACKGROUND OF THE INVENTION

The present inventions are related to systems and methods for determining either or both signal power and noise power derived from a received signal set.

Receiving information in a data transmission system is effected by various noise factors and is often expressed as a ratio of signal power to noise power. Such transmission systems may include, for example, wireless or wired data transmission systems where data is transferred from a transmission device to a receiving device, and data storage systems where data is transferred to a storage medium in a write operation and retrieved from the same storage medium in a read operation. Knowledge of signal power and noise power may be used in a number of aspects of such systems.

As an example, in a data storage system signal power and noise power can be determined by writing a pattern that is x bits long y times. The written data is then read back z times. This read back data is stored to a memory structure where it may be later accessed and used to perform a signal to noise ratio calculation. Such an approach yields a reasonable estimate of signal to noise ratio, however, it demands a large memory structure. In particular, the memory structure would be of a size x*y*z. In many situations, a large memory structure is impractical. To alleviate this memory requirement, one or more of x, y and z may be reduced. As the accuracy of the signal to noise estimate is reduced where the number of bits used to perform the estimate, the aforementioned approach results in a potential reduction in the accuracy of the signal to noise estimate.

Hence, for at least the aforementioned reasons, there exists a need in the art for advanced systems and methods for estimating signal power, noise power and/or a combination thereof.

BRIEF SUMMARY OF THE INVENTION

The present inventions are related to systems and methods for determining either or both signal power and noise power derived from a received signal set.

Various embodiments of the present inventions provide storage devices that include a storage medium with an $N_a \times N_w$ data pattern. The $N_a \times N_w$ data pattern includes $N_a$ bits repeated $N_w$ times. Both $N_a$ and $N_w$ are each greater than one. The storage devices further include a signal and noise estimation circuit with a first register and a second register. The first register has a capacity less than $N_a * N_w$. The second register uses a capacity less than $N_a * N_w + 1$, and data included in the second register is derived from data from the first register. The signal to noise estimation circuit further includes a noise power calculation circuit that calculates a noise power based on data from the second register, and a signal power calculation circuit that calculates a signal power based on data from the first register.

Other embodiments of the present invention provide methods for determining signal power and noise power. Such methods include providing a storage medium that includes a $N_a \times N_w$ data pattern. The $N_a \times N_w$ data pattern includes $N_a$ bits repeated $N_w$ times. Both $N_a$ and $N_w$ are each greater than one. The methods further include performing an initial read of the $N_a \times N_w$ data pattern, which is stored to a first register. $N_r$ subsequent reads of the $N_a \times N_w$ data pattern are each processed by: performing a subsequent read of the $N_a \times N_w$ data pattern, and performing a difference calculation using the initial read of the $N_a \times N_w$ data pattern and the subsequent read of the $N_a \times N_w$ data pattern and resulting in the calculation of a difference vector that is stored to a second register; and performing a difference accumulation calculation to generate an accumulation vector which is stored to a third register. Based at least in part on the stored $N_a \times N_w$ data pattern and the stored difference vector, an electronics noise power is calculated.

Yet other embodiments of the present invention provide systems for computing signal power an noise power. Such systems include a storage medium that includes a $N_a \times N_w$ data pattern. The $N_a \times N_w$ data pattern includes $N_a$ bits repeated $N_w$ times. Both $N_a$ and $N_w$ are each greater than one. The systems further include a processor and a computer readable medium that includes instructions executable by the processor to read the $N_a \times N_w$ data pattern from the storage medium; calculate a signal power by summing the values of the $N_a \times N_w$ data pattern for each $N_w$ to generate a signal vector, and aggregating the square of the elements of the signal vector; calculate a noise power based at least in part by summing the square of each element of the $N_a \times N_w$ data pattern; and calculate a signal to noise ratio by dividing the signal power by the noise power.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for determining either or both signal power and noise power derived from a received signal set.

Various embodiments of the present invention provide memory efficient circuits capable of estimating noise power and/or signal power in a received signal set. Where applied to a storage system, some embodiments of the present invention are further capable of decomposing the noise power into a media noise and electronics noise components. In some cases, knowledge of drive level signal to noise ratio in a storage system may be used to assess the quality of the replay signal, to assess the quality of the recording channel, and/or to tune one or more read channel detector parameters.

Figure 1:
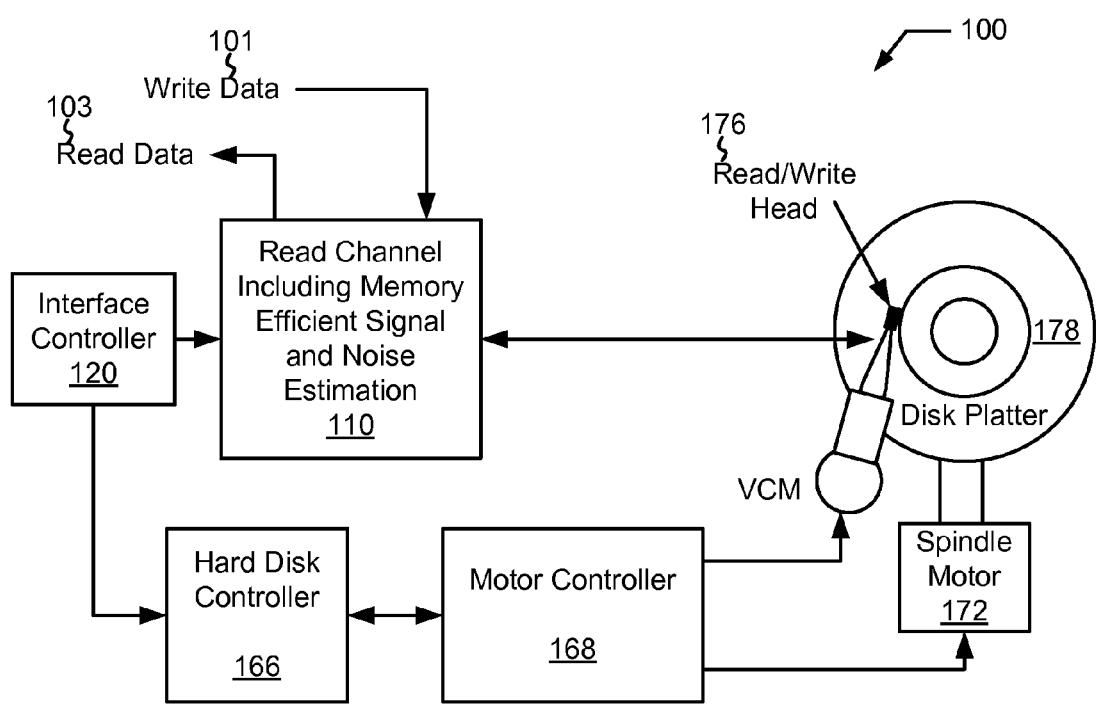
FIG. 1 depicts a storage system with a read channel including an noise estimation capability in accordance with various embodiments of the present invention.

Turning to FIG. 1, a storage system 100 is depicted including a read channel 110 with a memory efficient noise and signal estimation module in accordance with various embodiments of the present invention. Storage system 100 may be, for example, a hard disk drive. Read channel 110 may include any adaptive pre-compensation circuitry capable of efficiently determining pre-compensation values to be used in one or more write operations. As an example, the memory efficient noise and signal estimation module may be, but is not limited to, that described below in relation to FIG. 2, FIG. 4 or FIG. 6 below. In addition, storage system 100 includes an interface controller 120, a hard disk controller 166, a motor controller 168, a spindle motor 172, a disk platter 178, and a read/write head 176. Interface controller 120 controls addressing and timing of data transfer to/from disk platter 178. Disk platter 178 may be any magnetic storage medium known in the art including, but not limited to, a longitudinal magnetic storage medium or a perpendicular magnetic storage medium. The data on disk platter 178 consists of groups of magnetic signals that may be detected by read/write head assembly 176 when the assembly is properly positioned over disk platter 178. In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs).

Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel module 110. In turn, read channel module 110 decodes and digitizes the received analog signal to recreate the information originally written to disk platter 178. This data is provided as read data 103 to a receiving circuit. A write operation is substantially the opposite of the preceding read operation with write data 101 being provided to read channel module 110. This data is then encoded and written to disk platter 178. Of note, read channel module 110 is capable of writing information to disk platter 178 and subsequently reading the data back. The read back data is used to perform signal and noise estimation.

To provide a memory efficient implementation of signal and noise estimation, the following expression for estimating the electronics noise is utilized:

$$P_{ele} = \frac{1}{N_a N_w} \sum_{k=1}^{N_a} \sum_{l=1}^{N_w} (x[k, l, N_r] - Y_{Nr}[k, l])^2,$$

and $$Y_{Nr}[k, l] = \frac{1}{N_r} \sum_{m=1}^{N_w} x[k, l, m].$$

This expression uses the electronics noise present in samples from only one read rather than that present in all available reads. While this substantially reduces the memory requirement, it does not reduce the number of samples that are used in estimating electronics noise power. As $Y_{Nr}[k,l]$ involves the accumulation of analog to digital samples over all reads, the bit width needed for the accumulation will increase as the number of reads, $N_r$, increases. To eliminate this dependency, the dynamic range of the signal is reduced by calculating an error signal in accordance with the following equation:

$$e[k,l,m]=x[k,l,m]-x[k,1,1].$$

Since the noiseless signal in $x[k,l,m]$ is the same as that in $x[k,1,1]$ for all k, l and m, the difference signal, $e[k,l,m]$, corresponds to the noise components. Consequently, the dynamic range of $e[k,l,m]$ should be less than $x[k,l,m]$. From this, the signal power, media noise power and electronics noise power can be expressed as:

$$P_{ele} = \frac{1}{N_a N_w} \sum_{k=1}^{N_a} \sum_{l=1}^{N_w} (e[k, l, N_r] - E_{Nr}[k, l])^2, \quad (1a)$$

$$P_{med} = \frac{1}{N_a N_w} \sum_{k=1}^{N_a} \sum_{l=1}^{N_w} (E_{Nr}[k, l] - b[k])^2, \quad (2a)$$

and $$P_{sig} = \frac{1}{N_a} \sum_{k=1}^{N_a} (b[k] + x[k, 1, 1])^2, \quad (3a)$$

where $b[k]$ and $E_{Nr}[k,l]$ are calculated as follows:

$$E_{Nr}[k, l] = \frac{1}{N_r} \sum_{m=1}^{N_r} e[k, l, m], \quad (4a)$$

and $$b[k] = \frac{1}{N_w} \sum_{l1=1}^{N_w} E_{Nr}[k, l1].$$

Of note, the electronic noise is random, and thus averages out where a large samples set is utilized.

In one embodiment of the present invention, $E_{Nr}[k,l]$ is re-written as:

$$E_{Nr}[k, l] = \frac{1}{N_r} F_{Nr}[k, l], \quad (5a)$$

$$\text{where } F_{Nr}[k, l] = \sum_{m=1}^{N_r} e[k, l, m].$$

The quantity $F_{Nr}[k,l]$ can be computed recursively as:

$$F_m[k,l]=F_{m-1}[k,l]+e[k,l,m], \text{ for } m=1,2,\ldots,N_r,$$

With $F_0[k,l]=0$, for $k=1, 2, \ldots, N_a$ and $l=1, 2, \ldots, N_w$. Based on this, the electronic noise power, the media noise power and the signal power may be estimated by first computing $E_{Nr}[k,l]$ using equation (5a) above by processing the samples derived from $N_r$ reads. At the $N_r^{th}$ read, $b[k]$ is computed from $E_{Nr}[k, l]$ using equation (4a) above. Next, $P_{ele}$, $P_{med}$ and $P_{sig}$ are calculated using equations (1a-3a), respectively. The amount of memory used to implement this approach is $2N_wN_a+N_a$. In particular, $2N_wN_a$ memory cells are used for holding $F_m[k,l]$ and the samples from the $m^{th}$ read for all k and l, and $N_a$ memory cells are used to hold $x[k,1,1]$ (i.e., the first read).

The memory used for holding the samples from the $N_r^{th}$ read can be reused for holding b[k] for all k. Thus, by implementing the aforementioned memory efficiency modification, the total memory required is independent of the number of reads, $N_r$.

Various modifications may be implemented to increase the accuracy of the calculations set forth above in relation to the currently discussed embodiment. In particular, various accumulated quantities involve a division to achieve the average quantities $E_{Nr}[k,l]$ and b[k]. For the sake of ease of implementation and minimizing any errors due to fixed point mathematics, the algorithm may be modified to avoid the use of division until the conclusion of the algorithm. To do this, the quantity $F_{Nr}[k,l]$ is used in place of $E_{Nr}[k,l]$ and b[k]. This is done by exploiting the relationship between $\{E_{Nr}[k,l], b[k]\}$ and $F_{Nr}[k,l]$ as set forth above. From this relationship, the following noise and signal power equations are possible from modifying equations (1a-3a) above:

$$P_{ele} = \frac{1}{N_a N_w N_r^2} \sum_{k=1}^{N_a} \sum_{l=1}^{N_w} (N_r * e[k,l,N_r] - F_{Nr}[k,l])^2, \quad (6a)$$

$$P_{med} = \frac{1}{N_a N_w^3 N_r^2} \sum_{k=1}^{N_a} \sum_{l=1}^{N_w} (N_w * F_{Nr}[k,l] - G[k])^2, \quad (7a)$$

and $$P_{sig} = \frac{1}{N_a N_w^2 N_r^2} \sum_{k=1}^{N_a} (G[k] + N_w N_r * x[k,1,1])^2, \quad (8a)$$

where $G[k] = \sum_{l1=1}^{N_w} F_{Nr}[k, l1]$.

Further, quantization noise (i.e., noise introduced due to the step size of an upstream analog to digital converter) may be compensated in some cases. Such quantization noise may become particularly acute at higher signal to noise ratios. Compensation for quantization noise may be accomplished by assuming noise is stochastically independent from sample to sample. From this, it is possible to get approximate relationship between the powers estimated using fixed-point computations and the corresponding powers estimated using floating-point computations. These relationships are set forth in the following equations:

$$P_{ele} \approx \underline{P}_{ele} + \frac{N_r - 1}{N_r} * \sigma_0^2, \quad (9a)$$

$$P_{med} \approx \underline{P}_{med} + \frac{N_w - 1}{N_w N_r} * \sigma_0^2, \quad (10a)$$

$$P_{sig} \approx \underline{P}_{sig} + \frac{1}{N_w N_r} * \sigma_0^2. \quad (11a)$$

In these, $\{P_{ele}, P_{med}, P_{sig}\}$ correspond to powers estimated using fixed-point computations, and $\{\underline{P}_{ele}, \underline{P}_{med}, \underline{P}_{sig}\}$ correspond to powers estimated using floating-point calculations. Further, $\sigma_0^2$ denotes the quantization noise power associated with quantizing x[k,l,m]. Assuming uniform quantization, $\sigma_0^2 = \Delta_0^2/12$ where $\Delta_0$ is the quantization step-size. In situations where $N_a$, $N_w$ and $N_r$ are all reasonably large (e.g., greater than one hundred), the estimated powers that are most affected will be $P_{ele}$. Where the analog to digital conversion range and number of bits are known, it is possible to account for an estimate of quantization noise.

Figure 2:
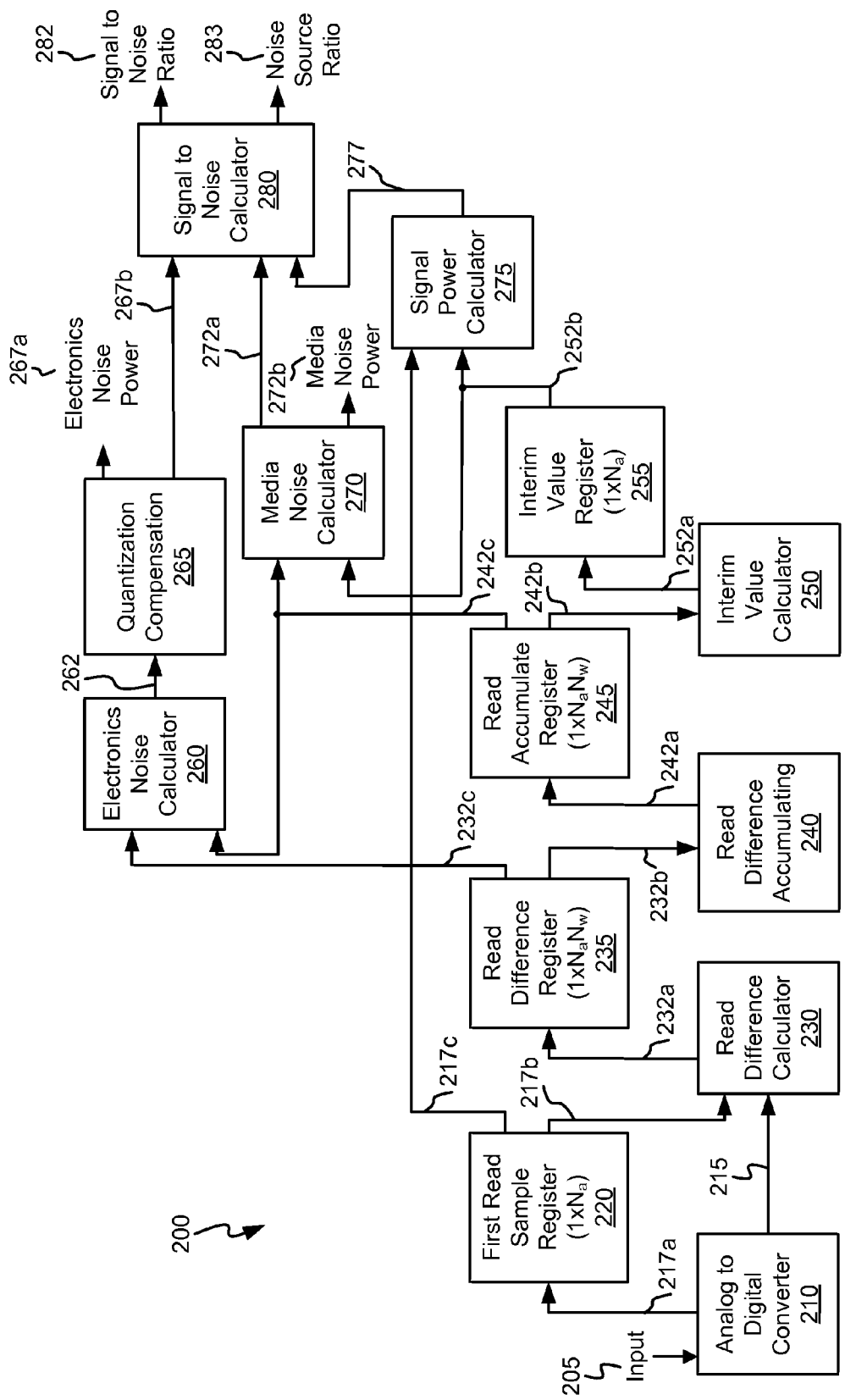
FIG. 2 depicts a memory efficient signal and noise estimation circuit in accordance with various embodiments of the present invention.

Turning to FIG. 2, a memory efficient signal and noise estimation module 200 is depicted. Signal and noise estimation module 200 includes an analog to digital converter 210 that receives an analog input 205, and provides a series of digital samples 215 corresponding to analog input 205. Analog input 205 includes a series of bits representing the written bit patterns (i.e., $N_a \times N_w$) repeated by the number of times it is re-read (i.e., $N_r$). Digital samples 215 are generally referred to as x[k,l,m] where k indicates the given bit in the original pattern, l indicates the given write, and m indicates the given read. The first read samples 217 of digital samples 215 (i.e., x[k,1,1]) are stored to a first read sample register 220 for use during the calculation processes. The size of first read sample register 220 is $1 \times N_a$.

Digital samples 215 and first read samples 217 are provided to a read difference calculator circuit 230. Read difference calculator circuit 230 calculates a sample by sample difference between digital samples 215 and first read samples 217 for each read set included in analog input 205 in accordance with the following equation:

$$e[k,l,m] = x[k,l,m] - x[k,1,1], \text{ for } k=1,2,\ldots,N_a \text{ and } l=1,2,\ldots,N_w. \quad (12a)$$

A resulting difference vector 232, e[k,l,m], is stored to a read difference register 235 of size $1 \times N_a N_w$. Difference vector 232 is provided to a read difference accumulating circuit 240 that accumulates multiple difference vectors 232 created across the multiple reads, $N_r$, into a two dimensional accumulation vector 242, $F_m[k,l]$, that is stored to a read accumulate register 245. Accumulation vector 242 is calculated in accordance with the following equation:

$$F_m[k,l] = F_{m-1}[k,l] + e[k,l,m], \text{ for } k=1,2,\ldots,N_a \text{ and } l=1,2,\ldots,N_w. \quad (13a)$$

Depending upon the number of read processes (i.e., $N_r$), the size of read accumulate register 245 may be substantially larger than read difference register 235 because the number of bits for each location may increase due to the accumulation process. Accumulation vector 242 is provided to an interim value calculator circuit 250 that calculates an interim value vector 252 in accordance with the following equation:

$$G[k] = \sum_{l1=1}^{N_w} F_{Nr}[k, l1], \quad (14a)$$

for $k = 1, 2, \ldots, N_a$.

Interim value vector 252 is stored to an interim value register 255. In some cases, interim value register 255 can reuse the memory of read difference register 235. Again, depending upon $N_r$, the size of interim value register 255 may be substantially larger than $N_a$ cells of read difference register 235 because the number of bits for each location may increase due to the accumulation process.

Difference vector 232 and accumulation vector 242 are both provided to an electronics noise calculator circuit 260 which calculates electronics noise power in accordance with the following equation:

$$P_{ele} = \frac{1}{N_a N_w N_r^2} \sum_{k=1}^{N_a} \sum_{l=1}^{N_w} (N_r * e[k, l, N_r] - F_{Nr}[k, l])^2. \quad (15a)$$

Electronics noise calculation circuit 260 provides an electronics noise power estimate 262 to a quantization compensation circuit 265 that compensates for the quantization effect in accordance with the following equation:

$$P_{ele} \leftarrow P_{ele} - \frac{Nr-1}{Nr} * \frac{\Delta_0^2}{12}, \quad (16a)$$

where $\Delta_0$ denotes the step size used for quantizing x[k,l,m] (i.e., the step size of analog to digital converter 210). Quantization compensation circuit 265 provides a electronics noise power output 267.

Accumulation vector 242 and interim value vector 252 are both provided to a media noise calculator circuit 270 which calculates media noise power in accordance with the following equation:

$$P_{med} = \frac{1}{N_a N_w^3 N_r^2} \sum_{k=1}^{Na} \sum_{l=1}^{Nw} (N_w * F_{Nr}[k,l] - G[k])^2. \quad (17a)$$

Media noise calculation circuit 270 provides a media noise power output 272. First read samples 217 and interim value vector 252 are provided to a signal power calculation circuit 275 that provides a signal power output 277 in accordance with the following equation:

$$P_{sig} = \frac{1}{N_a N_w^2 N_r^2} \sum_{k=1}^{Na} (G[k] + N_w N_r * x[k,1,1])^2. \quad (18a)$$

Using outputs 267, 272, 277, a signal to noise calculation circuit 280 calculates a signal to noise ratio 282 in accordance with the following equation:

$$SNR = \frac{P_{sig}}{P_{med} + P_{ele}}. \quad (19a)$$

Further, signal to noise calculation circuit 280 calculates a noise source ratio 283 in accordance with the following equation:

$$\alpha = \frac{P_{med}}{P_{med} + P_{ele}}. \quad (20a)$$

It should be noted that while various components of signal and noise estimation module 200 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, signal and noise estimation module 200 is implemented entirely as firmware or software being executed by a processor. In other embodiments of the present invention, signal and noise estimation module 200 is implemented entirely as a dedicated electronic circuit. In yet other embodiments of the present invention, signal and noise estimation module 200 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Figure 3:
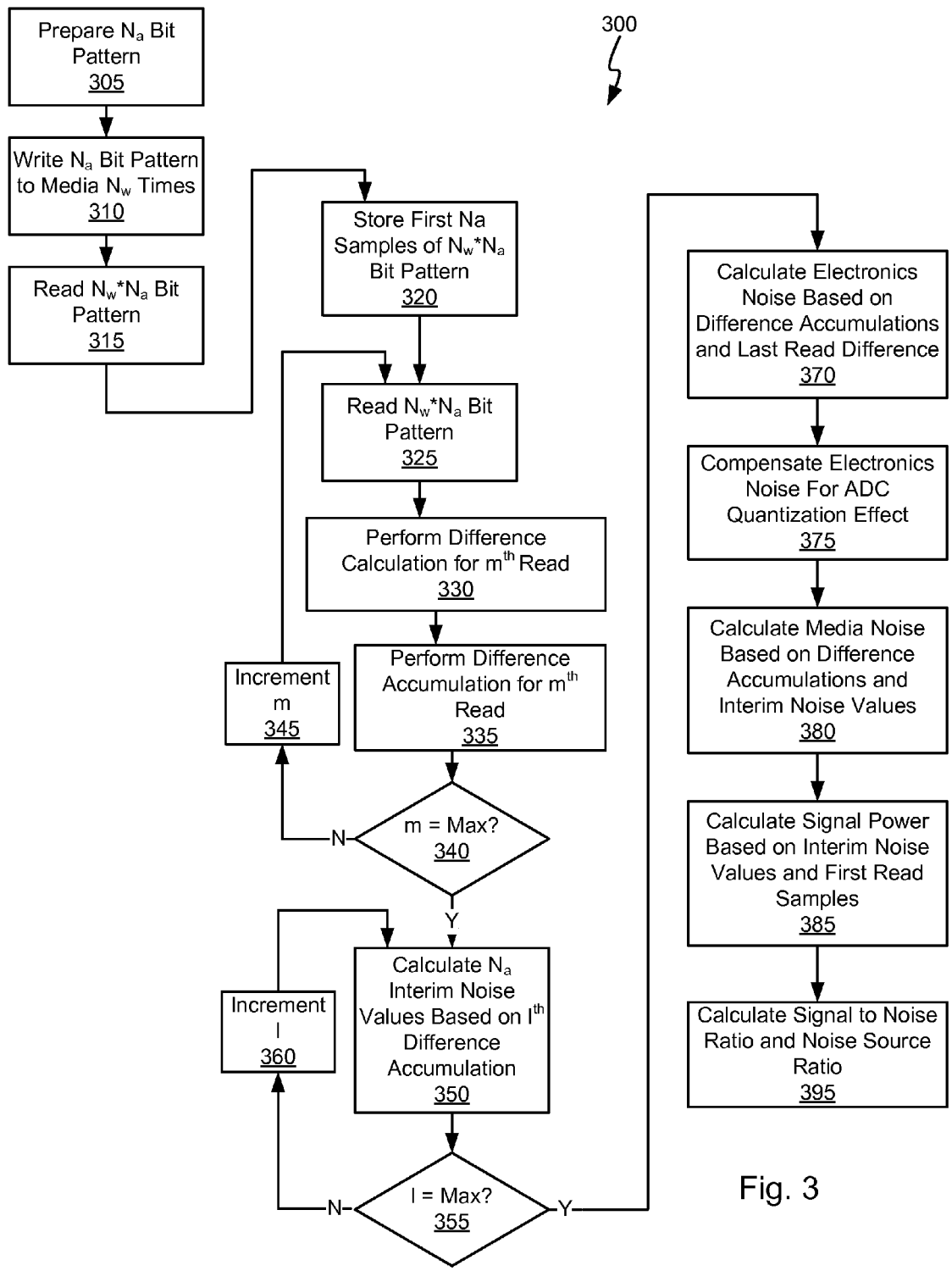
FIG. 3 depicts a method in accordance with some embodiments of the present invention for performing both signal and noise estimation.

Turning to FIG. 3, a flow diagram 300 depicts a method in accordance with some embodiments of the present invention for performing both signal and noise estimation. Prior to starting the process the quantities $F_0[k,l]$ is initialized to zero for k=1, 2, ..., $N_a$ and l=1, 2, ..., $N_w$. Following flow diagram 300, a pseudo-random bit pattern $N_a$ bits long is prepared (block 305). The bit pattern may be generated by any process known in the art for generating a reasonably random pattern. The pseudo-random bit pattern is written to a storage medium $N_w$ times (block 310) resulting in a pattern $N_a \times N_w$ long. The multiply written bit pattern is then read back from the storage medium (block 315). The first $N_a$ of the read samples are stored to a register (block 320).

The multiply written bit pattern is again read back from the storage medium (block 325), and a difference calculation is performed for the given read (block 330). The difference calculation is performed in accordance with equation (12a) set forth above. An accumulation calculation is additionally performed in accordance with equation (13a) set forth above (block 335). This process is repeated for each read of the multiply written data set. Thus, it is determined if the maximum number of reads have been accomplished (block 340). If not, the read counter is incremented (block 345) and blocks 325-340 are repeated.

Where the maximum number of reads has been processed (block 340), interim noise values are calculated for the various accumulations in accordance with equation (14a) above (block 350). This process is repeated for each write of the data set. Thus, it is determined if the maximum number of writes have been accomplished (block 355). If not, the write counter is incremented (block 360) and blocks 350-355 are repeated.

Where the maximum number of writes has been processed (block 355), the desired interim noise value have been calculated. At this point, electronics noise power is calculated (block 370) in accordance with equation (15a) above, and the effect of analog to digital quantization is mitigated in the calculated electronics noise power (block 375) in accordance with equation (16a) above. Further, the media noise power is calculated (block 380) in accordance with equation (17a) above, and the signal power is calculated (block 385) in accordance with equation (18a) above. Using the noise power values and the signal power value, a signal to noise ratio is calculated (block 395) in accordance with equation (19a) above, and a noise source ratio is calculated in accordance with equation (20a).

In another embodiment of the present invention, further memory enhancements may be made and yet still provide reasonable estimates of the various powers. In particular, even though the dynamic range of the difference samples, e[k,l,m], is less than that of the analog to digital samples, x[k,l,m], in the foregoing approach, the accumulators holding $F_m[k,l]$ will still overflow where m becomes sufficiently large. Furthermore, the overflow will occur for relatively small values of m where the signal to noise ratio is low. In this embodiment, modifications are made to eliminate the dependency on the value of m.

In this embodiment, the value of $E_{Nr}[k,l]$ is calculated recursively using the following equation (1b):

$$E_m[k, l] = \frac{1}{m} \sum_{m1=1}^{m} e[k, l, m1], \quad (1b)$$

for $m = 1, 2, \ldots, N_r$;

$$= \frac{m-1}{m} E_{m-1}[k, l] + \frac{1}{m} e[k, l, m];$$

$$= e[k, l, m1] + \frac{m-1}{m}(E_{m-1}[k, l] - e[k, l, m]),$$

where $E_0[k,l]=0$ for $k=1, 2, \ldots, N_a$ and $l=1, 2, \ldots, N_w$. Of note, in this case $E_m[k,l]$ is normalized by m, and thus the corresponding accumulators will not overflow dependent upon the size of m. Based on this, the electronic noise power, the media noise power, and the signal noise may be estimated by first computing $E_{Nr}[k,l]$ using equation (1b) above by processing the samples derived from $N_r$ reads one read at a time. At the $N_r^{th}$ read, b[k] is computed from $E_{Nr}[k,l]$ using equation (4a) above. Next, $P_{ele}, P_{med}$ and $P_{sig}$ are calculated using equations (1a-3a), respectively. The amount of memory used to implement this approach is $2N_w N_a + N_a$. In particular, $2N_w N_a$ memory cells are used for holding $E_m[k,l]$ and the samples from the $m^{th}$ read for all k and l, and $N_a$ memory cells are used to hold x[k,1,1] (i.e., the first read). The memory used for holding the samples from the $N_r^{th}$ read can be reused for holding b[k] for all k. Again, by implementing the aforementioned memory efficiency modification, the total memory required is independent of the number of reads, $N_r$. Further, the size of memory is independent of the size of the variable m.

In some cases, quantization noise may be compensated. Such quantization noise may become particularly acute at higher signal to noise ratios. Compensation for quantization noise may be accomplished by assuming noise is stochastically independent from sample to sample. From this, it is possible to get approximate relationship between the powers estimated using fixed-point computations and the corresponding powers estimated using floating-point computations. These relationships are set forth in the following equations:

$$P_{ele} \approx \underline{P}_{ele} + \sigma_0^2 + \sigma_1^2, \quad (2b)$$

$$P_{med} \approx \underline{P}_{med} + \sigma_1^2 + \sigma_2^2, \quad (3b)$$

$$P_{sig} \approx \underline{P}_{sig} + \sigma_2^2. \quad (4b)$$

In these, $\{P_{ele}, P_{med}, P_{sig}\}$ correspond to powers estimated using fixed-point computations, and $\{\underline{P}_{ele}, \underline{P}_{med}, \underline{P}_{sig}\}$ correspond to powers estimated using floating-point calculations. Further, $\{\sigma_0^2, \sigma_1^2, \sigma_2^2\}$ denote the respective quantization noise powers associated with quantizing x[k,l,m], $E_m[k,l]$ and b[k], respectively. Assuming uniform quantization, $\sigma_k^2 = \Delta_k^2/12$ where $\Delta_k$ is the quantization step-size, for $k=0, 1, 2$. In situations where $N_a$, $N_w$ and $N_r$ are all reasonably large (e.g., greater than one hundred), the estimated powers that are most affected will be $P_{ele}$. Where the analog to digital conversion range and number of bits are known, it is possible to account for an estimate of quantization noise.

Figure 4:
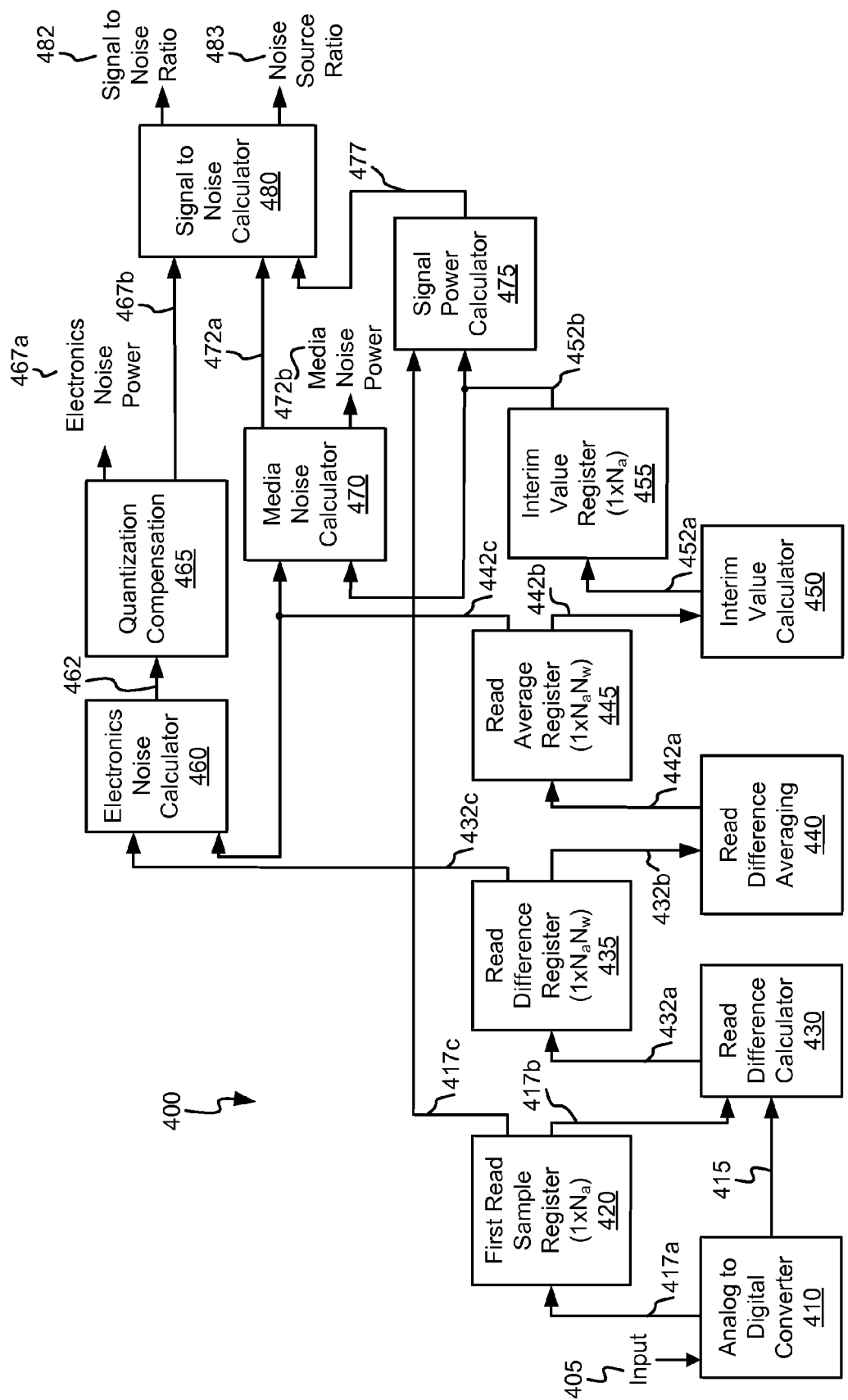
FIG. 4 depicts another memory efficient signal and noise estimation circuit in accordance with other embodiments of the present invention.

Turning to FIG. 4, another memory efficient signal and noise estimation module 400 is depicted. Signal and noise estimation module 400 includes an analog to digital converter 410 that receives an analog input 405, and provides a series of digital samples 415 corresponding to analog input 405. Analog input 405 includes a series of bits representing the written bit patterns (i.e., $N_a \times N_w$) repeated by the number of times it is re-read (i.e., $N_r$). Digital samples 415 are generally referred to as x[k,l,m] where k indicates the given bit in the original pattern, l indicates the given write, and m indicates the given read. The first read samples 417 of digital samples 415 (i.e., x[k,1,1]) are stored to a first read sample register 420 for use during the calculation processes. The size of first read sample register 420 is $1 \times N_a$.

Digital samples 415 and first read samples 417 are provided to a read difference calculator circuit 430. Read difference calculator circuit 430 calculates a sample by sample difference between digital samples 415 and first read samples 417 for each read set included in analog input 405 in accordance with the following equation:

$$e[k,l,m] = x[k,l,m] - x[k,1,1], \text{ for } k=1,2,\ldots,N_a \text{ and } l=1,2,\ldots,N_w. \quad (5b)$$

A resulting difference vector 432, e[k,l,m], is stored to a read difference register 435 of size $1 \times N_a N_w$. Difference vector 432 is provided to a read difference averaging circuit 440 that averages multiple difference vectors 432 created across the multiple reads, $N_r$, into a two dimensional accumulation vector 442, $E_m[k,l]$, that is stored to a read average register 445. Accumulation vector 442 is calculated in accordance with the following equation:

$$E_m[k, l] = e[k, l, m] + \frac{m-1}{m}(E_{m-1}[k, l] - e[k, l, m]), \quad (6b)$$

for $k = 1, 2, \ldots, N_a$ and $l = 1, 2, \ldots, N_w$.

In this case, regardless of the number of reads (i.e., $N_r$), the size of read average register 445 is the same as read difference register 435. Accumulation vector 442 is provided to an interim value calculator circuit 450 that calculates an interim value vector 452 in accordance with the following equation:

$$b[k] = \frac{1}{N_w} \sum_{l1=1}^{N_w} E_{Nr}[k, l1], \quad (7b)$$

for $k = 1, 2, \ldots, N_a$.

Interim value vector 452 is stored to an interim value register 455. In some cases, interim value register 455 can reuse the memory of read difference register 435. Again, regardless of the size of m, the size of interim value register 455 is the same as $N_a$ cells of read difference register 435.

Difference vector 432 and accumulation vector 442 are both provided to an electronics noise calculator circuit 460 which calculates electronics noise power in accordance with the following equation:

$$P_{ele} = \frac{1}{N_a N_w} \sum_{k=1}^{N_a} \sum_{l=1}^{N_w} (e[k, l, N_r] - E_{Nr}[k, l])^2. \quad (8b)$$

Electronics noise calculation circuit 460 provides an electronics noise power estimate 462 to a quantization compensation circuit 465 that compensates for the quantization effect in accordance with the following equation:

$$P_{ele} \leftarrow P_{ele} - \frac{\Delta_0^2 + \Delta_1^2}{12}, \quad (9b)$$

where $\Delta_0$ and $\Delta_1$ denote the step sizes used for quantizing x[k,l,m] (i.e., the step size of analog to digital converter 210)

and $E_m[k,l]$, respectively. Quantization compensation circuit 465 provides an electronics noise power output 467.

Accumulation vector 442 and interim value vector 452 are both provided to a media noise calculator circuit 470 which calculates media noise in accordance with the following equation:

$$P_{med} = \frac{1}{N_a N_w} \sum_{k=1}^{Na} (E_{Nr}[k,l] - b[k])^2. \tag{10b}$$

Media noise calculation circuit 470 provides a media noise power output 472. First read samples 417 and interim value vector 452 are provided to a signal power calculation circuit 475 that provides a signal power output 477 in accordance with the following equation:

$$P_{sig} = \frac{1}{N_a} \sum_{k=1}^{Na} (b[k] + x[k,1,1])^2. \tag{11b}$$

Using outputs 467, 472, 477, a signal to noise calculation circuit 480 calculates a signal to noise ratio 482 in accordance with the following equation:

$$SNR = \frac{P_{sig}}{P_{med} + P_{ele}}. \tag{12b}$$

Further, signal to noise calculation circuit 480 that calculates a noise source ratio 483 in accordance with the following equation:

$$\alpha = \frac{P_{med}}{P_{med} + P_{ele}}. \tag{13b}$$

It should be noted that while various components of signal and noise estimation module 400 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, signal and noise estimation module 400 is implemented entirely as firmware or software being executed by a processor. In other embodiments of the present invention, signal and noise estimation module 400 is implemented entirely as a dedicated electronic circuit. In yet other embodiments of the present invention, signal and noise estimation module 400 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Figure 5:
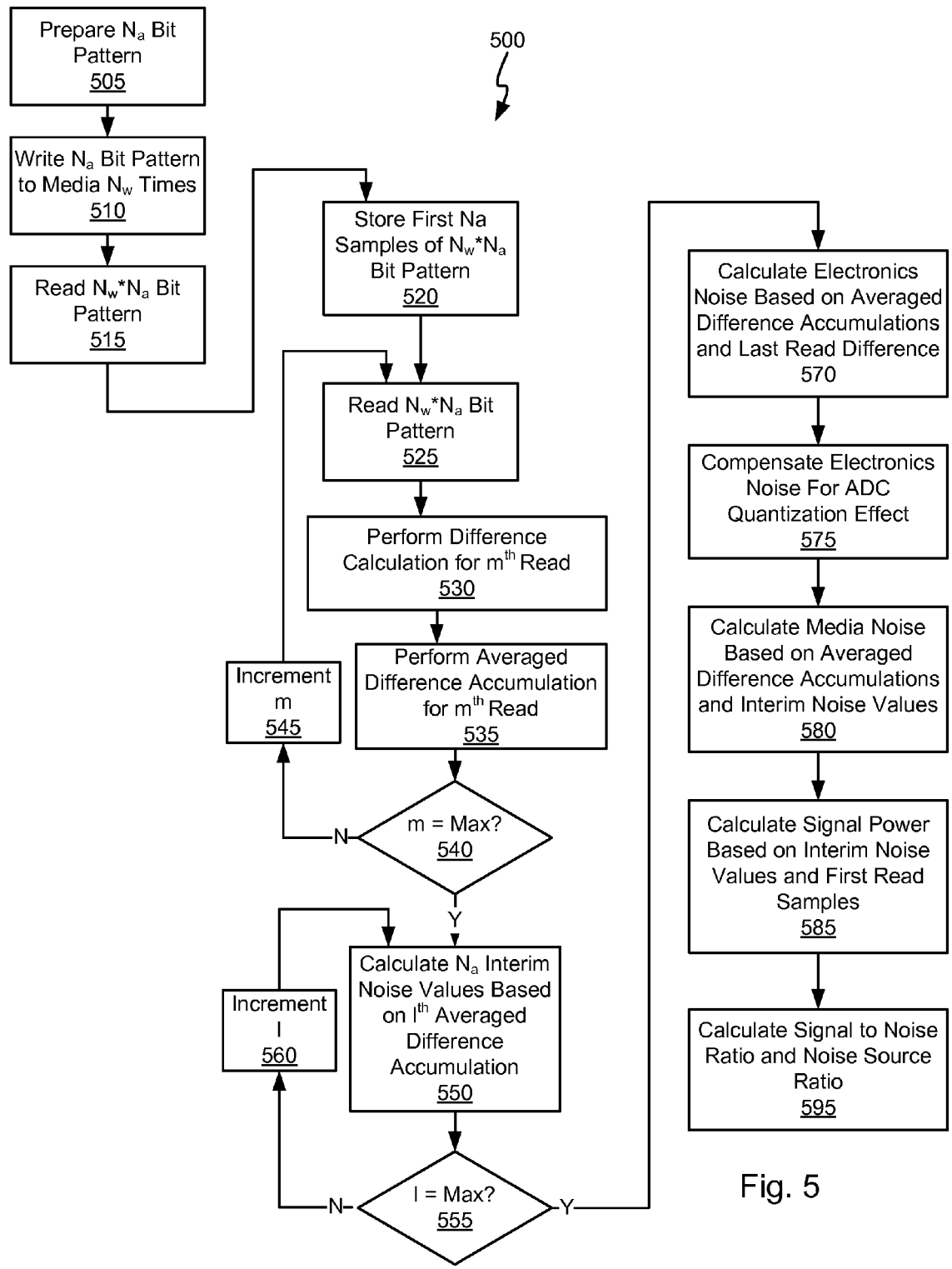
FIG. 5 depicts a method in accordance with various embodiments of the present invention for performing both signal and noise estimation.

Turning to FIG. 5, a flow diagram 500 depicts a method in accordance with some embodiments of the present invention for performing both signal and noise estimation. Prior to starting the process the quantities $E_0[k,l]$ is initialized to zero for $k=1, 2, \ldots, N_a$ and $l=1, 2, \ldots, N_w$. Following flow diagram 500, a pseudo-random bit pattern $N_a$ bits long is prepared (block 505). The bit pattern may be generated by any process known in the art for generating a reasonably random pattern. The pseudo-random bit pattern is written to a storage medium $N_w$ times (block 510) resulting in a pattern $N_a \times N_w$ long. The multiply written bit pattern is then read back from the storage medium (block 515), and the first $N_a$ samples are stored to a register (block 520).

The multiply written data pattern is again read back from the storage medium (block 525), and a difference calculation is performed for the given read (block 530). The difference calculation is performed in accordance with equation (5b) set forth above. An averaged accumulation calculation is additionally performed in accordance with equation (6b) set forth above (block 535). This process is repeated for each read of the multiply written data set. Thus, it is determined if the maximum number of reads have been accomplished (block 540). If not, the read counter is incremented (block 545) and blocks 525-540 are repeated.

Where the maximum number of reads has been processed (block 540), interim noise values are calculated for the various averaged accumulations in accordance with equation (7b) above (block 550). This process is repeated for each write of the data set. Thus, it is determined if the maximum number of writes have been accomplished (block 555). If not, the write counter is incremented (block 560) and blocks 550-555 are repeated.

Where the maximum number of writes has been processed (block 555), the electronics noise power is calculated (block 570) in accordance with equation (8b) above, and the effect of analog to digital quantization is mitigated in the calculated electronics noise power (block 575) in accordance with equation (9b) above. Further, the media noise power is calculated (block 580) in accordance with equation (10b) above, and the signal power is calculated (block 585) in accordance with equation (11b) above. Using the noise power values and the signal power value, a signal to noise ratio is calculated (block 595) in accordance with equation (12b) above, and a noise source ratio is calculated in accordance with equation (13b).

In yet other embodiments of the present invention, the media noise power is not separated from the electronics noise power. In such cases, the estimation of signal to noise ratio can be further simplified. To estimate the signal power and total noise power, it is enough to write the $N_a$ length pattern $N_w$ times, and read only once. This is because of the effect of averaging over difference writes gets rid of electronics noise and media noise, leaving only the signal components in the averaged data.

Let $x[k,l]$ be the $k^{th}$ sample at the output of the analog to digital converter in the $l^{th}$ repetition of the sequence, for $k=1, 2, \ldots, N_a$ and $l=1, 2, \ldots, N_w$. The approach for estimating the signal power and total noise power includes estimating the total noise power in accordance with the following equation:

$$P_{nse} = \frac{1}{N_a N_w} \sum_{k=1}^{Na} \sum_{l=1}^{Nw} (x[k,l] - \tilde{x}[k])^2, \tag{1c}$$

$$\tilde{x}[k] = \frac{1}{N_w} \sum_{l=1}^{Nw} x[k,l]. \tag{2c}$$

In this case, $\tilde{x}[k]$ is an estimate of the $k^{th}$ noiseless signal sample in any repetition, and $x[k,l]-\tilde{x}[k]$ is an estimate of the total noise in $x[k,l]$. Further, the signal power is estimated in accordance with the following equation:

$$\tilde{P}_{sig} = \frac{1}{N_a} \sum_{k=1}^{Na} \tilde{x}^2[k]. \quad (3c)$$

In this scenario, there are altogether $N_w N_a$ samples from $N_w$ repetitions of the $N_a$-length pattern. The total memory required is $N_w N_a + N_a$, which increases linearly with the number of writes, $N_w$.

A more memory efficient approach can be achieved by re-writing equation (1c) using equations (2c) and (3c) above. This results in the following equation:

$$P_{nse} = \frac{1}{N_a N_w} \tilde{X}_{Nw} - \tilde{P}_{sig}. \quad (4c)$$

where $\tilde{X}_{Nw} = \sum_{k=1}^{Na} \sum_{l=1}^{Nw} x^2[k, l]$.

From this, $\tilde{x}[k]$ can be re-written as:

$$\tilde{x}[k] = \frac{1}{N_w} \tilde{W}_{Nw}[k], \quad (5c)$$

where $\tilde{W}_{Nw}[k] = \sum_{l=1}^{Nw} x[k, l]$.

The quantities of $\tilde{X}_{Nw}$ and $\tilde{W}_{Nw}[k]$ can be recursively computed in accordance with the following equations:

$$\tilde{X}_l = \tilde{X}_{l-1} + \sum_{k=1}^{Na} x^2[k, l], \text{ for } l = 1, 2, \ldots, N_w; \text{ and} \quad (6c)$$

$$\tilde{W}_l[k] = \tilde{W}_{l-1}[k] + x[k,l], \text{ for } l=1,2,\ldots,N_w, \text{ and } k=1,2,\ldots,N_a;$$

with $\tilde{X}_0 = 0$ and $\tilde{W}_0[k] = 0$, for $k=1, 2, \ldots, N_a$. Based on this, the electronics noise power and the signal power can be calculated by first computing $\tilde{x}[k]$ and $\tilde{X}_{Nw}$ using equation (5c) and equation (6c), by processing the samples collected from $N_w$ repetitions, one repetition at a time. At the end of the $N_w^{th}$ repetition, $\tilde{P}_{sig}$ is calculated using equation (3c) and $P_{nse}$ is calculated using equation (4c). The amount of memory used to implement this approach is $2N_a+1$. Of note, the size of the memory is independent of the number of writes, $N_w$. In particular, $2N_a$ memory cells are used for holding $\tilde{W}_l[k]$ and the samples from the $l^{th}$ repetition, for all k, and one memory cell is used to hold $\tilde{X}_l$.

Various modifications may be implemented to increase the accuracy of the calculations set forth above in relation to the currently discussed embodiment. In particular, various accumulated quantities involve a division to achieve the average quantity $\tilde{x}[k]$. For the sake of ease of implementation and minimizing any errors due to fixed point mathematics, the algorithm may be modified to avoid the use of division until the conclusion of the algorithm. To do this, the quantity $\tilde{W}_{Nw}[k]$ is used in place of $\tilde{x}[k]$. This is done by exploiting the relationship between $\tilde{x}[k]$ and $\tilde{W}_{Nw}[k]$ as set forth above. From this relationship, the following signal power equation is possible by modifying equation (3c) above:

$$\tilde{P}_{sig} = \frac{1}{N_a N_w^2} \sum_{k=1}^{Na} \tilde{W}_{Nw}^2[k]. \quad (7c)$$

Further, in some cases, quantization noise may be compensated. Such quantization noise may become particularly acute at higher signal to noise ratios. Compensation for quantization noise may be accomplished by assuming noise is stochastically independent from sample to sample. From this, it is possible to get approximate relationship between the powers estimated using fixed-point computations and the corresponding powers estimated using floating-point computations. These relationships are set forth in the following equations:

$$P_{nse} \approx \underline{P}_{nse} + \frac{N_w - 1}{N_w} * \sigma_0^2, \quad (8c)$$

$$\tilde{P}_{sig} \approx \underline{\tilde{P}}_{sig} + \frac{1}{N_w} * \sigma_0^2. \quad (9c)$$

In these, $\{P_{nse}, \tilde{P}_{sig}\}$ correspond to powers estimated using fixed-point computations, and $\{\underline{P}_{nse}, \underline{\tilde{P}}_{sig}\}$ correspond to powers estimated using floating-point calculations. Further, $\sigma_0^2$ denotes the quantization noise power associated with quantizing $x[k,l,m]$. Assuming uniform quantization, $\sigma_0^2 = \Delta_0^2/12$ where $\Delta_0$ is the quantization step-size. In situations where $N_w$ is reasonably large (e.g., greater than one hundred), the estimated power that is most affected will be $P_{nse}$. Where the analog to digital conversion range and number of bits are known, it is possible to account for an estimate of quantization noise.

Figure 6:
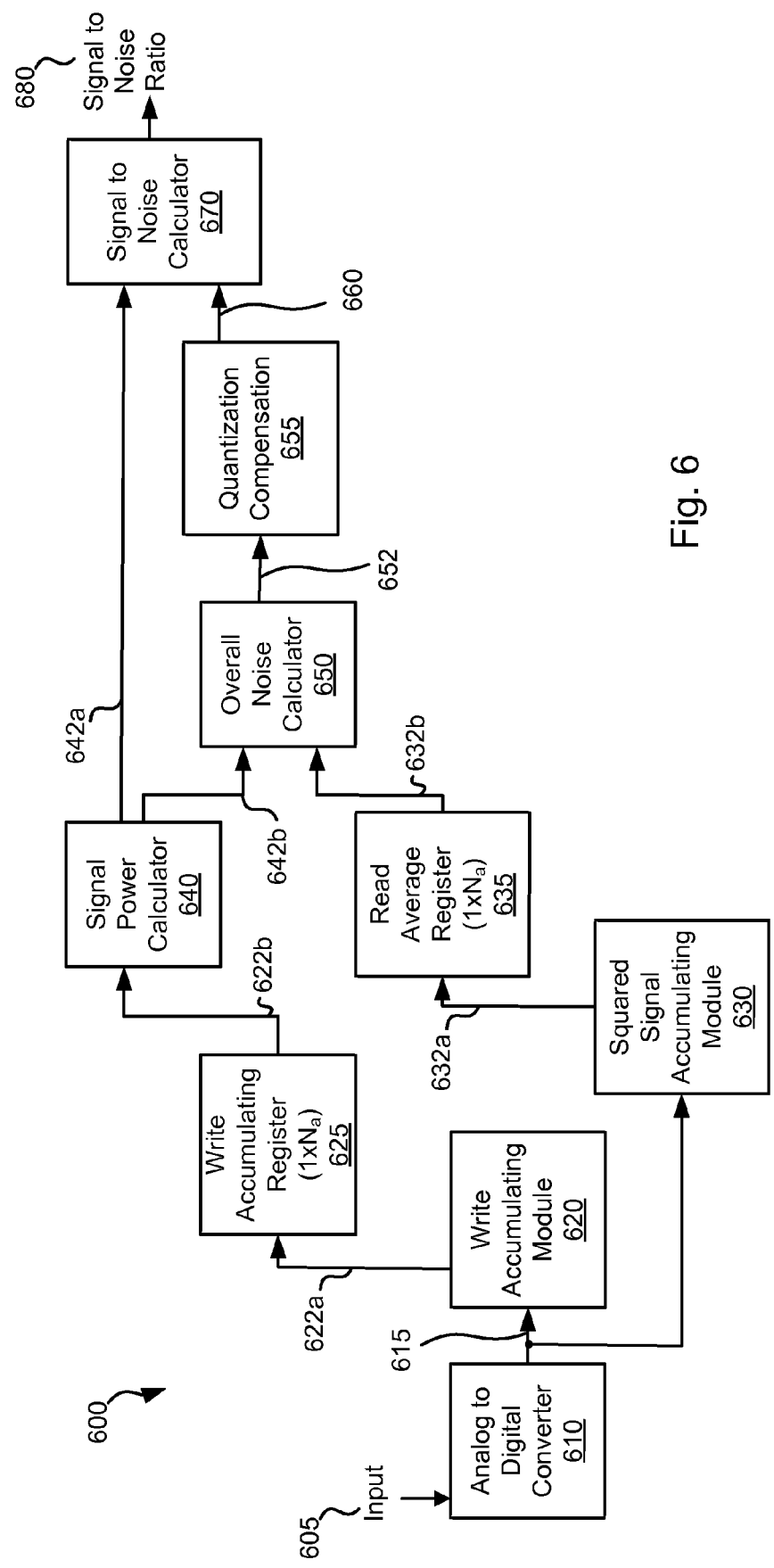
FIG. 6 depicts a signal and noise estimation circuit in accordance with one or more embodiments of the present invention.

Turning to FIG. 6, a memory efficient signal and noise estimation module 600 is depicted. Signal and noise estimation module 600 includes an analog to digital converter 610 that receives an analog input 605, and provides a series of digital samples 615 corresponding to analog input 605. Analog input 605 includes a series of bits representing the written bit patterns (i.e., $N_a \times N_w$) that are read $N_a$ samples at a time. Digital samples 615 are generally referred to as x[k,l] where k indicates the given bit in the original pattern and l indicates the given write.

Digital samples 615 are provided to a write accumulating module 620. Write accumulating module 620 accumulates samples in accordance with the following equation:

$$\tilde{W}_l[k] = \tilde{W}_{l-1}[k] + x[k,l], \text{ for } k=1,2,\ldots,N_a. \quad (10c)$$

A resulting accumulation vector 622, is stored to a write accumulating register 625 of size $1 \times N_a$. Write accumulation vector 622 is provided to signal power calculator circuit 640 that calculates signal power and provides a signal power output 642 in accordance with the following equation:

$$\tilde{P}_{sig} = \frac{1}{N_a N_w^2} \sum_{k=1}^{Na} \tilde{W}_{Nw}^2[k]. \quad (11c)$$

In addition, a squared signal accumulation module 630 calculates an accumulation of the squared signal and provides an accumulated signal output 632 in accordance with the following equation:

$$\tilde{X}_l = \tilde{X}_{l-1} + \sum_{k=1}^{Na} x^2[k, l]. \quad (12c)$$

Accumulated signal output 632 and signal power output 642 are provided to an overall noise calculator circuit 650. Overall noise calculator circuit 650 calculates noise and provides a noise power output 652 in accordance with the following equation:

$$P_{nse} = \frac{1}{N_a N_w} * \tilde{X}_{Nw} - \tilde{P}_{sig}. \quad (13c)$$

Noise power output 652 is provided to a quantization compensation circuit 655 that compensates for any quantization noise in accordance with the following equation:

$$P_{nse} \leftarrow P_{nse} - \frac{N_w - 1}{N_w} * \frac{\Delta_0^2}{12}, \quad (14c)$$

where $\Delta_0$ denotes the step-size used for quantizing x[k,l]. Quantization compensation circuit 655 provides a compensated noise power output 660. Signal power output 642 and compensated noise power output 660 are provided to a signal to noise calculator circuit 670 that calculates a signal to noise ratio 680 in accordance with the following equation:

$$SNR = \frac{P_{sig}}{P_{nse}}. \quad (15c)$$

It should be noted that while various components of signal and noise estimation module 600 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, signal and noise estimation module 600 is implemented entirely as firmware or software being executed by a processor. In other embodiments of the present invention, signal and noise estimation module 600 is implemented entirely as a dedicated electronic circuit. In yet other embodiments of the present invention, signal and noise estimation module 600 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Figure 7:
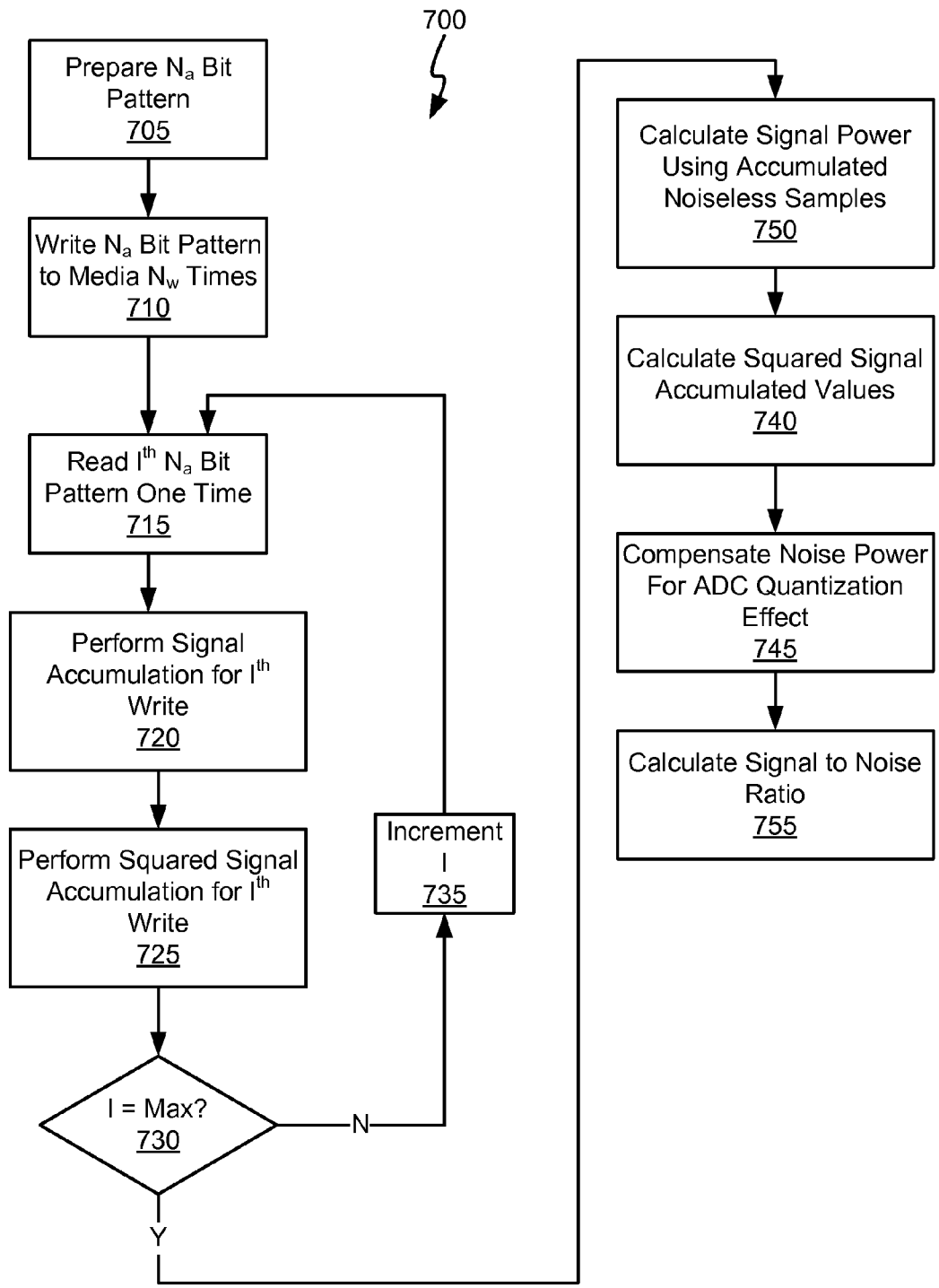
FIG. 7 depicts a method in accordance with various embodiments of the present invention for performing both signal and noise estimation.

Turning to FIG. 7, a flow diagram 700 depicts a method in accordance with some embodiments of the present invention for performing both signal and noise estimation. Following flow diagram 700, a pseudo-random bit pattern $N_a$ bits long is prepared (block 705). The bit pattern may be generated by any process known in the art for generating a reasonably random pattern. The pseudo-random bit pattern is written to a storage medium $N_w$ times (block 710) resulting in a pattern $N_a \times N_w$ long. The multiply written bit pattern is then read back from the storage medium (block 715), one repetition at a time. It should be noted that with a moderate increase in memory size that the multiply written bit pattern could be read back all at once.

A signal accumulation is performed for the $l^{th}$ write (block 720) in accordance with equation (10c) above. In addition, a squared signal accumulation is performed for the $l^{th}$ write (block 725) in accordance with equation (12c) above. This process is performed for each write. Thus, it is determined if the maximum number of writes have been accomplished (block 730). If not, the write counter is incremented (block 735) and blocks 715-730 are repeated.

Where the maximum number of writes has been processed (block 730), the signal power is calculated (block 750) in accordance with equation (11c). Further, the noise power is calculated (block 740) in accordance with equation (13c), and the calculated noise power is compensated for analog to digital converter quantization effect (block 745) in accordance with equation (14c) above. Using the signal power and noise power, a signal to noise ratio is calculated (block 755) in accordance with equation (15c) above.

In some cases, accuracy may be improved where the data manipulated is maximally random. In particular cases, the data is derived from a pseudo-random number generator. Further, accuracy may be improved where a large number of samples and/or bits are used. Thus, in some cases, one or more of $N_a$, $N_r$ and $N_w$ may be chosen to be large. Further, in some cases signal to noise calculation may be done when the read channel is not doing data detection. In such cases, the memory needed for performing the signal to noise calculation may be that implemented for performing data detection.

In conclusion, the invention provides novel systems, devices, methods and arrangements for performing signal and/or noise estimation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
  a storage medium, wherein the storage medium includes a $N_a \times N_w$ data pattern, wherein the $N_a \times N_w$ data pattern includes $N_a$ bits repeated $N_w$ times, and wherein $N_a$ and $N_w$ are each greater than one;
  a signal and noise estimation circuit, wherein the signal and noise estimation circuit includes:
    a first register, wherein the first register has a capacity less than $N_a * N_w$;
    a second register, wherein the second register uses a capacity less than $N_a * N_w + 1$, and wherein data included in the second register is derived from data from the first register;
    a noise power calculation circuit, wherein the noise power calculation circuit is operable to calculate a noise power based on data from the second register; and
    a signal power calculation circuit, wherein the signal power calculation circuit is operable to calculate a signal power based on data from the first register.

2. The storage device of claim 1, wherein the signal and noise estimation circuit further includes:

a third register, wherein data included in the third register is derived from data from the second register; and wherein the noise power calculation circuit calculates the noise power based on data from the second register and the third register.

3. The storage device of claim 2, wherein the $N_a \times N_w$ data pattern is read Nr times, and wherein the third register has a capacity of less than $N_a * N_w * N_r$.

4. The storage device of claim 2, wherein the signal and noise estimation circuit further includes:
   a fourth register, wherein the fourth register includes data derived from the third register, and wherein the fourth register has a capacity less than $N_a * N_w$;
   wherein the noise power includes an electronics noise power and a media noise power, wherein the electronics noise power is calculated based on data from the second register and the third register, and wherein the media noise power is calculated based on data from the third register and the fourth register.

5. The storage device of claim 2, wherein the first register holds first read samples, wherein the second register holds an accumulated read difference, and wherein the third register holds a read average.

6. The storage device of claim 1, wherein the signal and noise estimation circuit further includes:
   a signal to noise ratio calculation circuit, wherein the signal to noise calculation circuit provides a signal to noise ratio output calculated based on the noise power and the signal power.

7. A method for determining signal power and noise power, the method comprising:
   (a) providing a storage medium, wherein the storage medium includes a $N_a \times N_w$ data pattern, wherein the $N_a \times N_w$ data pattern includes $N_a$ bits repeated $N_w$ times, and wherein $N_a$ and $N_w$ are each greater than one;
   (b) performing an initial read of the $N_a \times N_w$ data pattern;
   (c) storing the first Na samples of the $N_a \times N_w$ data pattern to a first register;
   (d) performing a subsequent read of the $N_a \times N_w$ data pattern;
   (e) performing a difference calculation using the initial read of the $N_a \times N_w$ data pattern and the subsequent read of the $N_a \times N_w$ data pattern, wherein a difference vector is generated;
   (f) storing the resulting difference vector to a second register;
   (g) performing a difference accumulation calculation based at least in part on the difference vector, wherein an accumulation vector is generated;
   (h) storing the resulting accumulation vector to a third register;
   (i) repeating elements (d) through (h) for Nr reads; and
   (j) calculating an electronics noise power using the stored $N_a \times N_w$ accumulation vector and the stored difference vector.

8. The method of claim 7, wherein the first register has a capacity of less than $N_a * N_w$, and wherein the second register and the third register each have a capacity of approximately $N_a * N_w$.

9. The method of claim 7, wherein the difference accumulation calculation is done in accordance with the following equation:

$$F_m[k,l] = F_{m-1}[k,l] + e[k,l,m], \text{ for } k=1,2,\ldots,N_a \text{ and } l=1,2,\ldots,N_w;$$

wherein m indicates a particular read instance, and wherein $F_{m-1}[k,l]$ is a previously calculated accumulation vector corresponding to another read instance.

10. The method of claim 9, wherein the electronics noise power is calculated in accordance with the following equation:

$$P_{ele} = \frac{1}{N_a N_w N_r^2} \sum_{k=1}^{Na} \sum_{l=1}^{Nw} (N_r * e[k,l,N_r] - F_{N_r}[k,l])^2,$$

and wherein $e[k,l,N_r]$ indicates the difference vector and $F_{N_r}[k,l]$ indicates the accumulation vector.

11. The method of claim 7, wherein the difference accumulation calculation is done in accordance with the following equation:

$$E_m[k,l] = e[k,l,m] + \frac{m-1}{m}(E_{m-1}[k,l] - e[k,l,m]),$$

for $k = 1, 2, \ldots, N_a$ and $l = 1, 2, \ldots, N_w$;

wherein m indicates a particular read instance, and wherein $E_{m-1}[k,l]$ is a previously calculated accumulation vector corresponding to another read instance.

12. The method of claim 11, wherein the electronics noise power is calculated in accordance with the following equation:

$$P_{ele} = \frac{1}{N_a N_w} \sum_{k=1}^{Na} \sum_{l=1}^{Nw} (e[k,l,N_r] - E_{N_r}[k,l])^2,$$

and wherein $e[k,l,N_r]$ indicates the difference vector and $E_{N_r}[k,l]$ indicates the accumulation vector.

13. The method of claim 7, the method further comprising:
   calculating an interim value vector based on the accumulation vector.

14. The method of claim 13, wherein the method further comprises:
   calculating a media noise power based at least in part on the stored accumulation vector and the interim value vector.

15. The method of claim 14, wherein the method further comprises:
   calculating a signal power based at least in part on the interim value vector and $N_a$ samples from the first read.

16. The method of claim 13, wherein the interim value vector is calculated in accordance with the following equation:

$$I[k] = \frac{1}{N_w} \sum_{l1=1}^{Nw} A_{N_r}[k,l1], \text{ for } k = 1, 2, \ldots, N_a;$$

and wherein $A_{N_r}[k,l_1]$ indicates the stored accumulation vector.

17. The method of claim 16, wherein the media power is calculated in accordance with the following equation:

$$P_{med} = \frac{1}{N_a N_w} \sum_{k=1}^{Na} (E_{Nr}[k, l] - I[k])^2,$$

and wherein I[k] indicates the interim value vector and $E_{Nr}[k,l]$ indicates the accumulation vector.

18. The method of claim 16, wherein the media power is calculated in accordance with the following equation:

$$P_{med} = \frac{1}{N_a N_w^3 N_r^2} \sum_{k=1}^{Na} \sum_{l=1}^{Nw} (N_w * F_{Nr}[k, l] - I[k])^2,$$

and wherein I[k] indicates the interim value vector and $F_{Nr}[k,l]$ indicates the accumulation vector.

19. The method of claim 16, wherein the method further comprises:
calculating a signal power based at least in part on the interim value vector and the Na samples, wherein the signal power is calculated in accordance with the following equation:

$$P_{sig} = \frac{1}{N_a} \sum_{k=1}^{Na} ([k] + x[k, 1, 1])^2,$$

and wherein I[k] indicates the interim value vector and x[k, 1,1] indicates the stored $N_a \times 1$ vector of samples.

20. A system for computing signal power and noise power, the system comprising:
a storage medium, wherein the storage medium includes a $N_a \times N_w$ data pattern, wherein the $N_a \times N_w$ data pattern includes $N_a$ bits repeated $N_w$ times, and wherein $N_a$ and $N_w$ are each greater than one;
a processor and a computer readable medium, wherein the computer readable medium includes instructions executable by the processor to:
read the $N_a \times N_w$ data pattern from the storage medium;
calculate a signal power by summing the values of the $N_a \times N_w$ data pattern for each $N_w$ to generate a signal vector, and aggregating the square of the elements of the signal vector;
calculate a noise power based at least in part by summing the square of each element of the $N_a \times N_w$ data pattern; and
calculate a signal to noise ratio by dividing the signal power by the noise power.

\* \* \* \* \*